United States Patent [19]
Marcus et al.

[11] Patent Number: 5,217,099
[45] Date of Patent: Jun. 8, 1993

[54] CORROSION-RESISTANT HEAVY DUTY CONVEYOR ROLLER

[76] Inventors: Ralph G. Marcus, 6534 Peach Ave., Van Nuys, Calif. 91406; Ruben E. Ramos, 5851 Blackbird La., La Verne, Calif. 91750

[21] Appl. No.: 888,003

[22] Filed: May 26, 1992

[51] Int. Cl.[5] .............................................. B65G 13/02
[52] U.S. Cl. ..................................... 193/37; 198/780
[58] Field of Search ............... 193/37, 35 R; 198/780, 198/842, 843

[56] References Cited

U.S. PATENT DOCUMENTS

| | | | |
|---|---|---|---|
| 4,111,087 | 9/1978 | Pankratz et al. | 198/781 |
| 4,314,629 | 2/1982 | Shilander et al. | 198/789 X |
| 4,385,683 | 5/1983 | Krupp | 193/37 |
| 4,524,861 | 6/1985 | Matsushita | 198/781 |
| 4,645,071 | 2/1987 | Faulkner | 198/842 |

Primary Examiner—Robert P. Olszewski
Assistant Examiner—Cheryl L. Gastineau
Attorney, Agent, or Firm—J. E. McTaggart

[57] ABSTRACT

The construction of a conveyor roller, for handling heavy corrosive loads such as large lead-acid type batteries of the type used in forklift trucks and the like, is made corrosion-resistant by utilizing two appropriate plastic materials: one for an electrically insulated resilient roller body and the other for a pair of rigid corrosion-resistant long-life sleeve bearings which never require lubrication. The roller body may be cut to length from continuously extruded plastic hollow bar material such as PVC, providing an economical roller with a resilient surface. The sleeve bearings, pressed into recesses at each end of the roller, made from plastic rod material such as polypropylene having suitable rigidity and bearing properties, engage the roller rotatably on a steel shaft which is captively mounted in a conveyor assembly. The central bore of the roller portion is dimensioned to provide a designated clearance around the shaft.

6 Claims, 2 Drawing Sheets

CORROSION-RESISTANT HEAVY DUTY CONVEYOR ROLLER

FIELD OF THE INVENTION

The present invention relates to conveyor mechanisms of the roller type, and more particularly it relates to the structure and manufacture of corrosion-resistant conveyor rollers for handling heavy corrosive loads such as lead-acid storage batteries.

BACKGROUND OF THE INVENTION

Roller type conveyor apparatus is commonly utilized for handling heavy items, for example installing and removing large lead-acid storage batteries, such as those used in warehouse forklift trucks, to and from their host vehicle for regular recharging purposes. In conventional heavy duty conveyors, the rollers, bearings and shafts are made from metal, typically steel. When metallic conveyors are utilized for battery handling there are two potential problems:

(A) there may be electrical leakage currents from metal battery housings to the metal rollers, and
(B) acid or other corrosives spilling and/or leaking from the batteries tend to corrode the metal rollers and leach to the metal bearings, causing them to seize.

In one known approach to corrosion resistance a sheath of plastic such as $\frac{1}{4}"$ thick PVC (polyvinyl chloride) is added over a metal roller. In another approach the entire roller may be made non-metallic and attached concentrically around a rotatable steel shaft in the manner of a washing machine roller. Such approaches provide electrical insulation to remedy problem (A); however, with metal-to-metal bearing surfaces, problem (B) remains since it is likely that leaching of corrosive fluids will damage and eventually destroy the bearings.

The use of a non-metallic material such as plastic throughout would solve both problems (A) and (B); however, no practical plastic material is known to provide suitable low bearing surface friction and long bearing life in a plastic-to-plastic bearing interface while also providing a suitable resilient roller surface along with the required ultimate overall strength, especially in the shaft.

DESCRIPTION OF THE PRIOR ART

Non-metallic rollers engaging cantilevered stub shafts, one at each end facing inwardly, are exemplified in U.S. Pat. Nos. 3,353,644 to McNash et al, 4,078,641 to Payne and 4,213,523 to Frost et al. U.S Pat. No. 4,393,969 to Woell discloses rollers made from non-metallic pipe sections, having inserted end pieces providing integral outward-facing shaft stubs.

Such roller structures may be suitable for light loading, however the evolution of the present invention has led to the conclusion that the heavy duty service addressed requires a sturdy one-piece steel shaft traversing the entire roller, since any plastic materials which provide a suitable resilient roller surface, particularly in thin-wall tubing or pipe form, would tend to sag excessively under heavy load, and, when used in combination with cantilevered stub shafts such as those in the prior art cited, would tend to develop high bending stresses in the stub shafts and to thus suffer from excessive rotational drag and rapid bearing deterioration when subjected to heavy loads.

As an illustration of the need to reinforce a resilient roller for a heavy load, U.S. Pat. No. 4,896,758 to Hoszowski discloses a fluted insert, for a dual-conical boat trailer roller, which traverses full length inside the roller providing ridge means to form air-circulating channels.

OBJECTS OF THE INVENTION

It is a primary object of the present invention to provide a corrosion-resistant cylindrical conveyor roller configuration of adequate strength to handle heavy loads such as storage batteries.

It is a further object to provide an electrically-insulated resilient working surface on the main body portion of the roller.

It is a still further object to provide hard, durable, corrosion-resistant long-life bearings for roller rotation.

SUMMARY OF THE INVENTION

The foregoing objects have been met in the present invention of a roller configuration having a main body portion made from a resilient plastic material and fitted with a pair of sleeve bearings, made from a rigid durable plastic material, pressed into cavities at each end of the main body portion of the roller. The two bearings cooperate rotationally with a concentric steel shaft.

BRIEF DESCRIPTION OF THE DRAWINGS

The above and further objects, features and advantages of the present invention will be more fully understood from the following description taken with the accompanying drawings in which.

DETAILED DESCRIPTION

Figure 1:
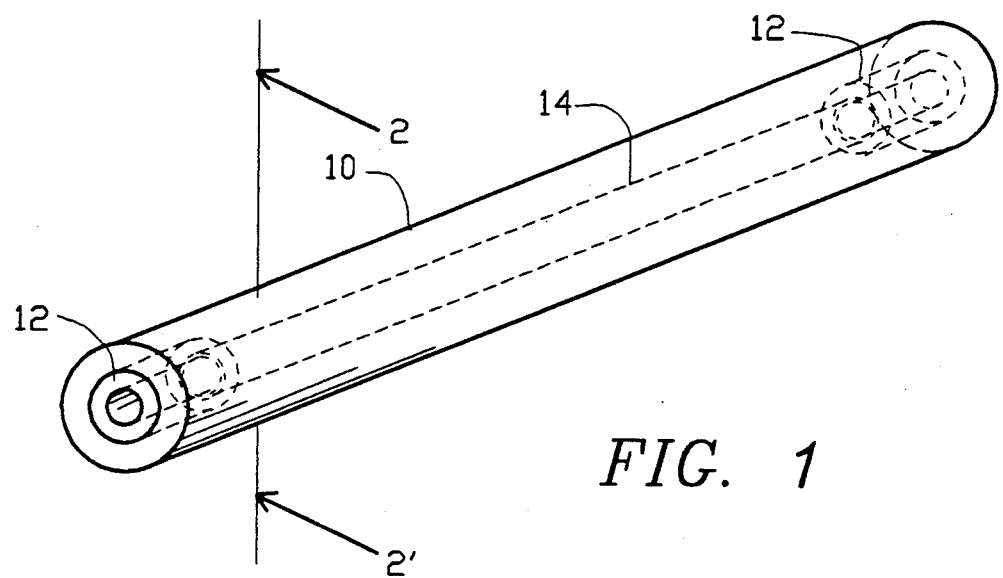
FIG. 1 is a three dimensional view of a conveyor roller assembly of the present invention.

In FIG. 1, a three dimensional view depicts a roller assembly of the present invention having an elongated tubular roller portion 10 formed from a length of resilient thick-wall plastic hollow bar. At each end of roller portion 10, a rigid non-metallic coaxial sleeve bearing 12 is retained frictionally in a suitably sized recess machined into the ends of roller portion 10, coaxial with roller portion 10 and its inside bore 14.

Figure 2:
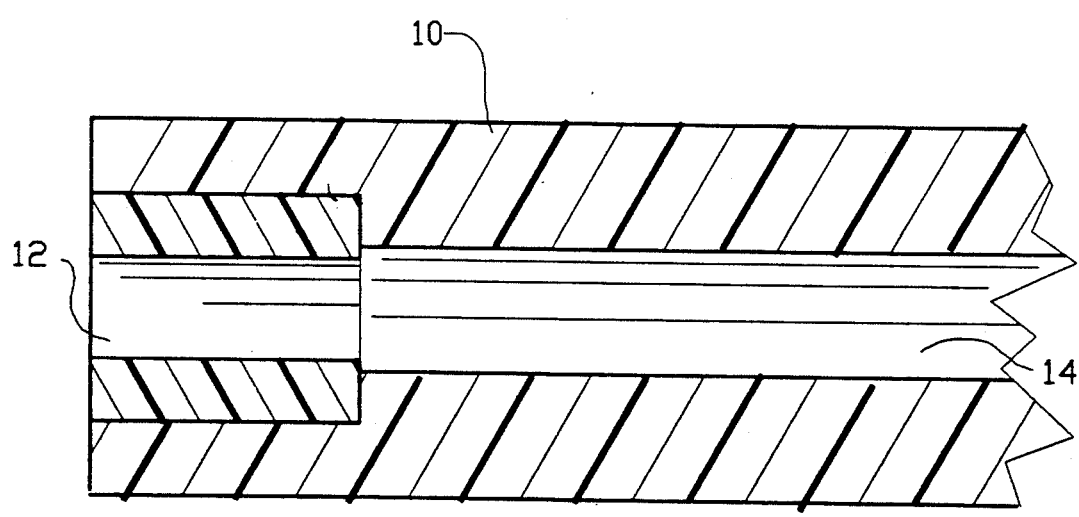
FIG. 2 is a cross sectional view taken through axis 2-2' of FIG. 1.

FIG. 2 shows a cross section of the left hand end of the roller assembly of FIG. 1 taken through axis 2—2', showing sleeve bearing 12 fitted into the machined recess which is contiguous with the bore 14 whose diameter is somewhat larger than that of the bearing surface in sleeve bearing 12 whose inside diameter is dimensioned to provide a working rotational fit with a shaft of designated diameter.

Figure 3:
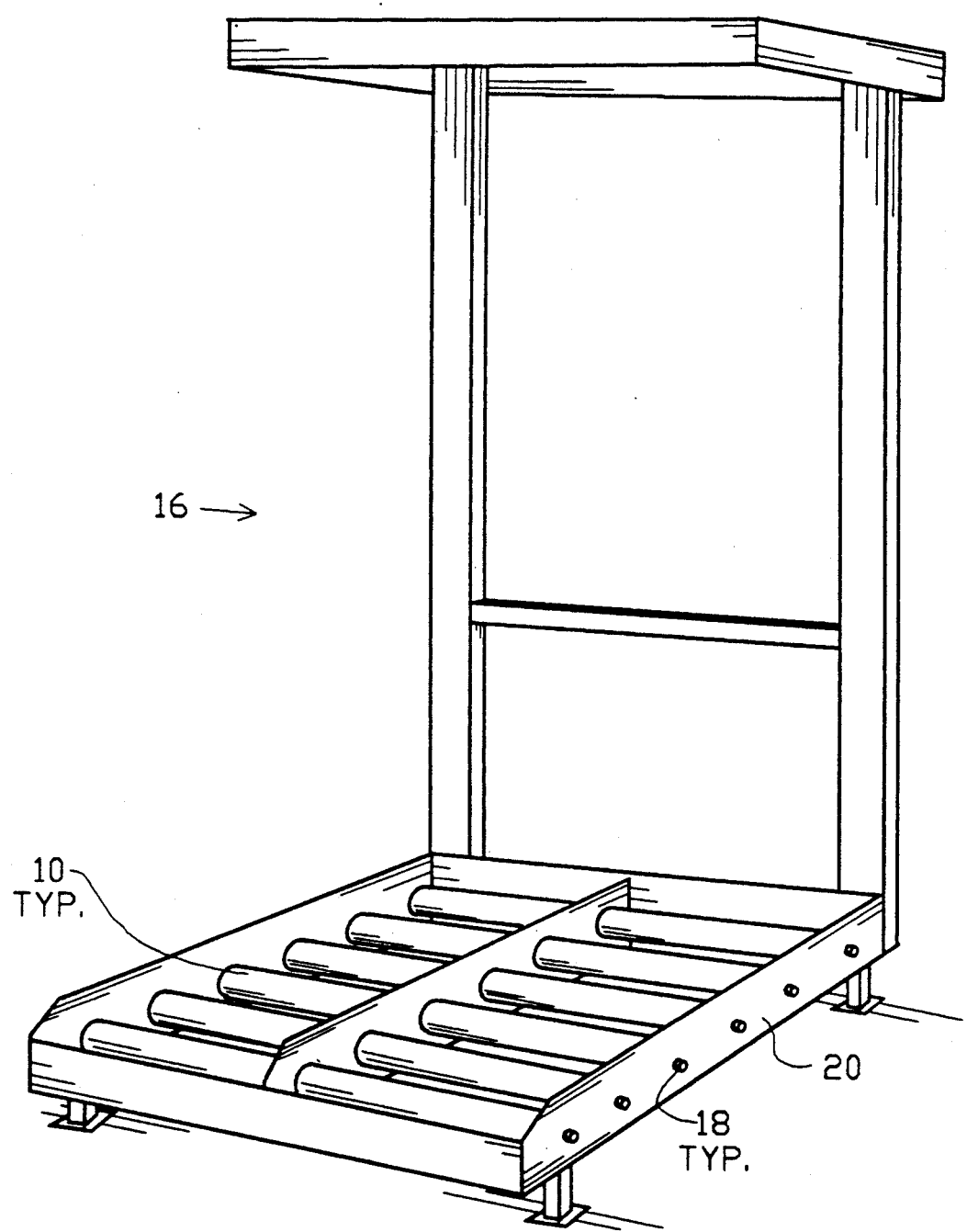
FIG. 3 is a perspective view of a conveyor assembly utilizing roller assemblies such as those shown in FIGS. 1 and 2.

FIG. 3 is a perspective view of a conveyer assembly 16 fitted with an array of identical rollers of the present invention of which a typical roller portion 10 is indicated. Traversing through each roller assembly is a metal shaft 18 of which an end is seen traversing an opening in the framework 20 of the conveyor assembly 16. Shaft 18 is captivated longitudinally in framework 20, typically by means of a cotter pin at each end.

The configuration shown as an illustrative embodiment has two roller tracks side by side: alternatively there could be a single track or more than two tracks side by side. The length of shafts 18 may be made such as to provide one shaft for each roller, or alternatively a longer shaft length could allow shaft 18 to traverse two or more adjacent rollers.

In a preferred embodiment suitable for carrying heavy duty lead acid storage batteries of the type employed in warehouse forklift trucks and the like, roller portions 10 are made from hollow bar having an outside diameter of 2.25" and inside diameter of 0.75". The inside diameter of the mounting recesses in the rollers is dimensioned to provide a press fit with the outside diameter of the sleeve bearing, typically 1.25". The inside diameter of sleeve bearings 12 is made to provide a working rotational fit with the designated shaft diameter, typically 0.625". The length of sleeve bearings 12 (and the depth of the mounting recesses) is a matter of design choice: a typical value is 1.5".

The roller portion 10 may be fabricated by cutting required lengths from a continuously extruded PVC (polyvinyl chloride) hollow bar and machining the recess into each end, thus providing an economical, resilient and durable roller surface.

The sleeve bearing may be fabricated by cutting required lengths from extruded polypropylene plastic rod and drilling or machining the central bore to provide a durable bearing surface to interface rotationally with the metal shaft 18, which is typically made from cold rolled steel. Optionally, at additional expense, the shaft could be made from stainless steel to further inhibit rust and corrosion.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A heavy duty corrosion-resistant conveyor roller assembly comprising:

a non-metallic elongated cylindrical main roller portion configured to have a concentric bore contingent with a pair of cylindrical recesses disposed one at each opposite end of the roller portion, the bore and the recesses being made concentric about a rotational axis of the roller portion, the bore being made to have a diameter dimensioned to provide a predetermined clearance about a designated nominal diameter; and a pair of non-metallic cylindrical sleeve bearings each frictionally retaining one in each of the recesses in said main roller portion, each sleeve bearing having an inside diameter defining a bearing surface dimensioned in accordance with the designated nominal diameter.

2. The conveyor roller assembly as defined in claim 1 further comprising a central metallic shaft of the designated nominal diameter, traversing said roller portion, rotatably engaging said sleeve bearings and extending therefrom to engage a host conveyor assembly containing a plurality of like roller assemblies.

3. The conveyor roller assembly as defined in claim 2 wherein said shaft is made from steel.

4. The conveyor roller assembly as defined in claim 1 wherein said roller portion is made from a length of thick-walled polyvinyl chloride plastic hollow bar, machined at each end to provide the recesses, and wherein said sleeve bearings are fabricated from polypropylene plastic material and are pressed into place in the recesses so as to become frictionally retained therein.

5. The conveyor roller assembly as defined in claim 1 wherein said main roller portion is made from thick-walled hollow bar stock extruded from plastic material and cut off at a predetermined length.

6. The conveyor roller assembly as defined in claim 5 wherein said plastic material is polyvinyl chloride.

* * * * *